(12) United States Patent
Glazewski (10) Patent No.: US 10,295,068 B2
(45) Date of Patent: May 21, 2019

(54) VALVE HAVING A METAL-BELLOWS/PISTON UNIT

(71) Applicant: Robert Bosch GmbH, Stuttgart (DE)

(72) Inventor: Tadeusz Glazewski, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 38 days.

(21) Appl. No.: 15/532,705

(22) PCT Filed: Oct. 8, 2015

(86) PCT No.: PCT/EP2015/073307
§ 371 (c)(1),
(2) Date: Jun. 2, 2017

(87) PCT Pub. No.: WO2016/087097
PCT Pub. Date: Jun. 9, 2016

(65) Prior Publication Data
US 2017/0370481 A1 Dec. 28, 2017

(30) Foreign Application Priority Data

Dec. 5, 2014 (DE) ........................ 10 2014 224 979

(51) Int. Cl.
*F16K 11/074* (2006.01)
*F16K 11/02* (2006.01)
(Continued)

(52) U.S. Cl.
CPC ............ *F16K 11/027* (2013.01); *F16K 11/07* (2013.01); *F16K 11/0716* (2013.01);
(Continued)

(58) Field of Classification Search
CPC ........................................................ F16J 3/06
See application file for complete search history.

(56) References Cited

U.S. PATENT DOCUMENTS 1,178,528 A * 4/1916 Loepsinger ............ G05D 16/10
    137/495
1,740,669 A * 12/1929 Shaff ........................ B25D 9/14
    137/507
(Continued)

FOREIGN PATENT DOCUMENTS

DE    2054720    6/1971
DE    2553163    6/1977
(Continued)

OTHER PUBLICATIONS

International Search Report for Application No. PCT/EP2015/073307 dated Feb. 9, 2017 (English Translation, 3 pages).

*Primary Examiner* — Umashankar Venkatesan (74) *Attorney, Agent, or Firm* — Michael Best & Friedrich LLP (57) ABSTRACT

The invention relates to a valve (1), comprising a valve housing (4) and a closing body (3) arranged in the valve housing (4) in such a way that the closing body can be moved longitudinally, wherein at least one inlet channel (5) and at least one outlet channel (6) are arranged in the valve housing (4). The closing body (3) interacts with a valve seat (8) formed on the valve housing (4) by means of the longitudinal motion of the closing body and thereby opens and closes at least one hydraulic connection between the at least one inlet channel (5) and the at least one outlet channel (6). The closing body (3) can be driven by means of a metal-bellows/piston unit (2), wherein the metal-bellows/piston unit (2) has a variable-length metal bellows (20) and a variable-volume working chamber (23) and wherein the metal bellows (20) bounds the working chamber (23) in a sealing manner.

14 Claims, 6 Drawing Sheets

(51) Int. Cl.
  *F16K 31/126* (2006.01)
  *F16K 11/07* (2006.01)
  *F28D 15/02* (2006.01)
  *F28D 15/06* (2006.01)
  *F28D 21/00* (2006.01)

(52) U.S. Cl.
  CPC ...... *F16K 31/1262* (2013.01); *F28D 15/0266* (2013.01); *F28D 15/06* (2013.01); *F28D 21/0003* (2013.01); *F28D 2015/0291* (2013.01); *Y02T 10/16* (2013.01)

(56) References Cited

U.S. PATENT DOCUMENTS

| | | | | |
|---|---|---|---|---|
| 2,894,532 A | * | 7/1959 | Gaylord | B64D 13/02 |
| | | | | 137/505 |
| 3,477,507 A | * | 11/1969 | Page | E21B 34/08 |
| | | | | 137/466 |
| 4,004,608 A | * | 1/1977 | Kish | B60H 1/00485 |
| | | | | 137/510 |
| 4,877,048 A | * | 10/1989 | Oltean | B60C 23/003 |
| | | | | 137/225 |
| 2014/0182266 A1 | | 7/2014 | Hendrickson et al. | |
| 2015/0047351 A1 | | 2/2015 | Ishikawa et al. | |

FOREIGN PATENT DOCUMENTS

| | | |
|---|---|---|
| DE | 3800807 | 8/1989 |
| DE | 19600286 | 7/1997 |
| DE | 102011004640 | 8/2012 |
| DE | 102013114769 | 7/2014 |
| DE | 112012004058 | 7/2014 |
| GB | 900750 | 7/1962 |

\* cited by examiner

VALVE HAVING A METAL-BELLOWS/PISTON UNIT

BACKGROUND OF THE INVENTION

The invention relates to a valve having a metal-bellows/cylinder unit, wherein the metal-bellows/cylinder unit drives the valve. The valve according to the invention can be used, for example, in a waste heat recovery system of an internal combustion engine.

Valves are known in many different embodiments from the prior art.

A known valve comprises a valve housing and a closing body arranged in a longitudinally moveable manner in the valve housing. At least one inlet channel and at least one outlet channel are arranged in the valve housing. The closing body interacts by means of its longitudinal movement with a valve seat formed on the valve housing and thereby opens and closes at least one hydraulic connection between the at least one inlet channel and the at least one outlet channel. A valve of this type is known, for example, as a control valve for a fuel injector from laid-open application DE 102011004640 A1.

Furthermore, it is known from laid-open application DE 102013114769 A1 that valves of this type can be used in a waste heat recovery system for an internal combustion engine as inlet or outlet valves for an expansion machine arranged in the waste heat recovery system.

The publication document DE112012004058 A1 furthermore discloses an electromagnetically activatable valve which is arranged as a bypass valve in a waste heat recovery system.

Owing to the modes of action of the known valves, on and off positions can be activated rapidly and robustly, but intermediate positions, such as, for example, throttle positions, can no longer be activated rapidly and robustly.

SUMMARY OF THE INVENTION

By contrast, the valve according to the invention which is drivable with a metal-bellows/cylinder unit has the advantage that all of the valve positions can be activated rapidly and robustly. As a result, the flows through the valve can be very readily controlled quantitatively and also possible throttle functions of the valve can be very readily realized and used.

For this purpose, the valve comprises a valve housing and a closing body arranged in a longitudinally moveable manner in the valve housing. At least one inlet channel and at least one outlet channel are arranged in the valve housing. The closing body interacts by means of its longitudinal movement with a valve seat formed in the valve housing and thereby opens and closes at least one hydraulic connection between the at least one inlet channel and the at least one outlet channel. The closing body is drivable by a metal-bellows/cylinder unit. The metal-bellows/cylinder unit has a length-variable metal bellows, wherein the metal bellows bounds a volume-variable working chamber in a sealing manner. As a result, the metal bellows is, on the one hand, part of the drive of the valve, but, on the other hand, also seals the working chamber with respect to the surroundings.

In an advantageous manner, the closing body is drivable by the metal-bellows/cylinder unit counter to the spring force of a valve spring. The valve spring can thereby press the closing body back into its starting position in a simple manner.

Owing to the activation by the metal-bellows/cylinder unit, the valve according to the invention can be activated very robustly in all possible valve positions. By means of the pressure in the working chamber of the metal-bellows/cylinder unit, the closing body is displaced and therefore reaches a certain valve position. In an advantageous manner, the closing body here is braced between the metal-bellows/cylinder unit and a valve spring.

In an advantageous development, the metal-bellows/cylinder unit comprises a first cylinder, wherein the first cylinder is arranged displaceably with respect to the valve housing. As a result, the metal-bellows/cylinder unit can be stretched or compressed by the metal bellows being stretched or compressed; a relative displacement then occurs between a first cylinder and valve housing. The closing body of the valve is therefore driven in a simple and reliable manner by the stretching or compressing metal-bellows/cylinder unit. The first cylinder does not inevitably have to be shaped cylindrically here, but rather can be, for example, also of conical design.

In an advantageous manner, the metal-bellows/cylinder unit comprises a second cylinder, wherein the second cylinder is fixedly connected, in particular screwed, to the valve housing. As a result, the second cylinder is fixed with respect to the valve housing and only the first cylinder has to be displaceably guided. The second cylinder does not have to be entirely cylindrically shaped here, and only its part connected to the metal bellows advantageously has a cylindrical or else conical shape.

In an embodiment of the valve according to the invention, the first cylinder interacts with the closing body. As a result, force is directly transmitted from the first cylinder to the closing body. Possible assembly tolerances between first cylinder and closing body can be compensated for by the contact between first cylinder and closing body being realized in a frictionally engaged manner.

In another embodiment of the valve according to the invention, the first cylinder and the closing body are designed as a single part. As a result, the number of components of the valve is reduced, and the valve can accordingly be produced more advantageously.

In an advantageous development of the valve, a cylinder bore is formed in the second cylinder. A volume-variable additional volume which, together with the cylinder bore, forms the working chamber is formed in the interior of the metal bellows between the first cylinder and the second cylinder. As a result, the working chamber can be filled or emptied in a simple manner through the cylinder bore.

In an alternative embodiment, a blind hole bore is formed in the first cylinder and a cylinder bore is formed in the second cylinder. A volume-variable additional volume is formed in the interior of the metal bellows between the first cylinder and the second cylinder. The blind hole bore together with the cylinder bore and the additional volume forms the working chamber. As a result, firstly, the working chamber is enlarged such that the rise of pressure within the metal-bellows/cylinder unit can be better controlled. Secondly, the moving mass of the first cylinder and therefore the inertia thereof is reduced by the blind hole bore; all of the valve positions can therefore be reliably and rapidly activated without reverberations.

In a development of the valve, the working chamber is fillable by a control unit with a working fluid, wherein the cylinder bore is connected to the control unit by a connecting line. The working fluid can thus be conveyed in a simple manner through the cylinder bore into the working chamber or emptied therefrom. The control unit preferably fills or empties the working chamber depending on different physical variables, for example a pressure and/or a temperature in the inlet channel. Both a liquid and a gas can be used here as the working fluid.

In an advantageous development of the valve, the closing body comprises a first closing cylinder and a second closing cylinder. The first closing cylinder interacts with the valve seat, and the second closing cylinder interacts with a further valve seat formed in the valve housing. The functionality of the valve is extended by the further valve seat.

In an advantageous manner, a further outlet channel is arranged in the valve housing, wherein the second closing cylinder interacts with the further valve seat and thereby opens and closes a further hydraulic connection between the inlet channel and the further outlet channel. As a result, the valve has three connections and at least two valve positions. For example, a 3/2-way valve can be represented by this embodiment.

In an advantageous embodiment, in a first valve position of the valve, the first hydraulic connection is open and the second hydraulic connection is closed, and in a second valve position of the valve, the first hydraulic connection is closed and the second hydraulic connection is open. It is thereby ensured that, in the two end positions of the valve, the first hydraulic connection or the second hydraulic connection is closed while the other hydraulic connection in each case is open. The valve can therefore be very readily used, for example, as a bypass valve.

In an advantageous embodiment, in a third valve position of the valve, the first hydraulic connection and the second hydraulic connection are open. As a result, for example, a 3/3-way valve can be represented. The reliable and rapid activation of valve positions is particularly readily suitable for valves which have a multiplicity of valve positions. The mass flow of a fluid from the inlet channel to the outlet channel or to the further outlet channel can thereby be divided as desired.

In another advantageous development, in a third valve position of the valve, the first hydraulic connection and the second hydraulic connection are closed. As a result, both the outlet channel and the further outlet channel can be closed. In this valve position, the valve carries out the function of two shut-off valves.

In an advantageous embodiment, the valve according to the invention is arranged in a waste heat recovery system of an internal combustion engine. The waste heat recovery system comprises a circuit conducting a working medium, wherein the circuit comprises a collecting container, a pump, an evaporator, a bypass valve, an expansion machine and a condenser in the direction of flow of the working medium. A bypass line is arranged parallel to the expansion machine, wherein the bypass valve controls the mass flow of the working medium to the expansion machine and to the bypass line. The bypass valve is the valve according to the invention. As a result, the mass flow of the working medium can be divided as desired between the expansion machine and the bypass line. This can take place, for example, depending on the degree of evaporation of the working medium or of the temperature of the working medium.

In another advantageous embodiment, the valve according to the invention is arranged in a further waste heat recovery system of an internal combustion engine. The further waste heat recovery system has a circuit conducting a working medium, wherein the circuit comprises a collecting container, a pump, a distributor valve, two evaporators in a parallel connection, an expansion machine and a condenser in the direction of flow of the working medium. The distributor valve controls the mass flows of the working medium to the two evaporators. The distributor valve is the valve according to the invention. As a result, depending on the capability of the two evaporators, the mass flow of the working medium can be optimally divided between the two evaporators. Also, in the event of rapidly changing operating situations of the internal combustion engine, virtually any valve positions of the valve can therefore be rapidly activated.

DETAILED DESCRIPTION

Figure 1:
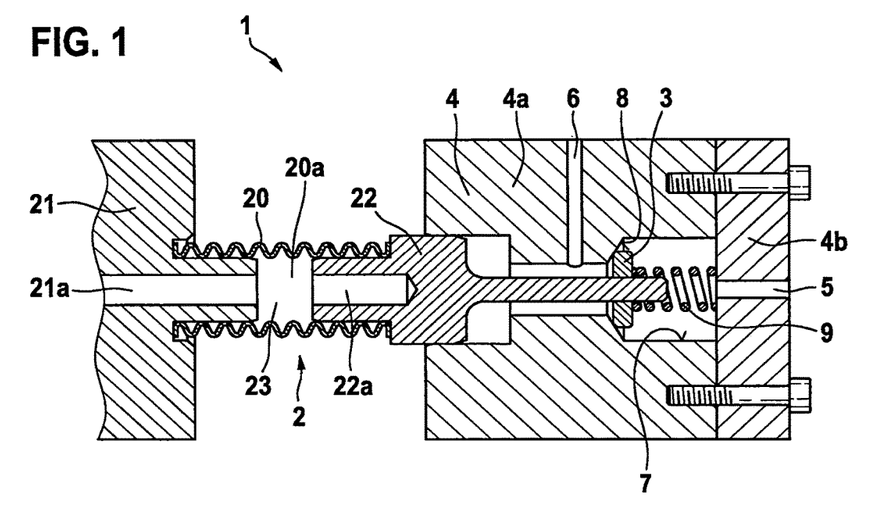
FIG. 1 shows a longitudinal section of an exemplary embodiment of the valve according to the invention, wherein only the essential regions are illustrated.

FIG. 1 shows a longitudinal section of an exemplary embodiment of the valve 1 according to the invention, wherein only the essential regions are illustrated. The valve 1 comprises a metal-bellows/cylinder unit 2 and a valve housing 4, wherein an inlet channel 5 and an outlet channel 6 are formed in the valve housing 4. Furthermore, a housing bore 7 into which the inlet channel 5 and the outlet channel 6 open is formed in the valve housing 4. In the exemplary embodiment of FIG. 1, the valve housing 4 is designed in two parts, with a first housing part 4a and a second housing part 4b which are screwed to each other.

The metal-bellows/cylinder unit 2 comprises a first cylinder 22, a second cylinder 21 and a metal bellows 20. The first cylinder 22 and the second cylinder 21 are arranged displaceably with respect to each other in the axial direction and are connected mechanically to each other by the metal bellows 20 and are sealed to the outside by said metal bellows. The first cylinder 22 is arranged in a longitudinally moveable manner in the housing bore 7. The second cylinder 21 is arranged rigidly with respect to the valve housing 4.

A cylinder bore 21a is formed in the second cylinder 21 and a blind hole bore 22a is formed in the first cylinder 22. In addition to the blind hole bore 22a, further bores can be formed in the first cylinder 22 in order, for example, to connect further valves 1 in series. The metal bellows 20 is arranged so as to at least partially surround the first cylinder 22 and the second cylinder 21, and therefore the interior of the metal bellows 20 is hydraulically connected to the cylinder bore 21a and blind hole bore 22a and thereby forms a working chamber 23. The working chamber 23 therefore comprises the cylinder bore 21a, the blind hole bore 22a and an additional volume 20a which is formed in the interior of the metal bellows 20 and is variable because of the stretchability of the metal bellows 20. The metal bellows 20 is preferably manufactured from a readily deformable thin metal.

In an alternative embodiment to FIG. 1, the metal bellows 20 can also be partially arranged within the blind hole bore 22a, and therefore a rise of pressure in the working chamber 23 assists the sealing action between metal bellows 20 and first cylinder 22 by the surface pressure between metal bellows 20 and first cylinder 22 being increased.

A closing body 3 is arranged on the first cylinder 22, for example is screwed thereto or pressed thereon. The closing body 3 interacts by means of the longitudinal movement of the first cylinder 22 with a valve seat 8 formed on the valve housing 4 and thereby opens and closes a hydraulic connection of the inlet channel 5 to the outlet channel 6. The closing body 3 is pressed against the valve seat 8 by a valve spring 9 arranged in the housing bore 7. When the working chamber 23 is filled, the metal-bellows/cylinder unit 2 expands counter to the spring force of the valve spring 9 and the closing body 3 is lifted off the valve seat 8. When the working chamber 23 is emptied, the metal-bellows/cylinder unit 2 is compressed by the spring force of the valve spring 9 and the closing body 3 is pressed against the valve seat 8. In the exemplary embodiment of FIG. 1, the interaction of closing body 3 and valve seat 8 is implemented in the form of a disc valve.

In alternative embodiments, the first cylinder 22 does not have a blind hole bore 22a, and therefore the working chamber 23 comprises only the cylinder bore 21a and the additional volume 20a. Although this reduces the volume of the working chamber 23, the manufacturing costs for the first cylinder 22 are lowered at the same time. The exemplary embodiments described below can also each alternatively be realized without a blind hole bore 22a.

Figure 2:
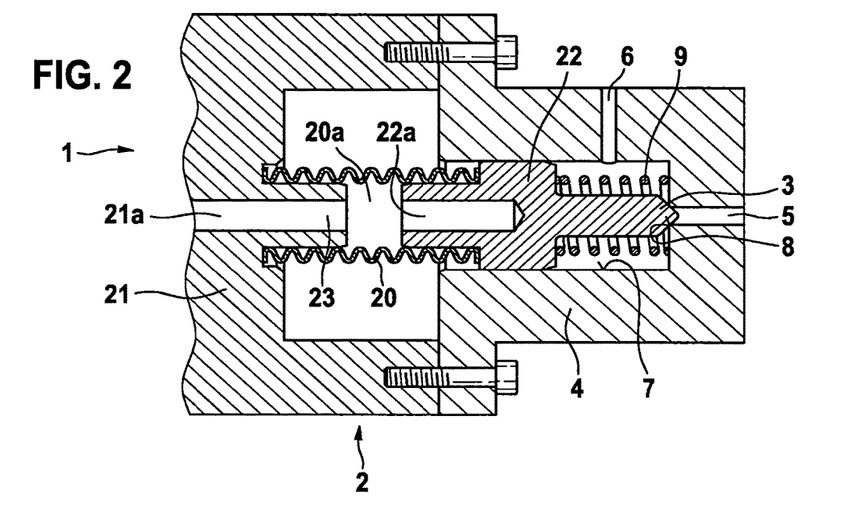
FIG. 2 shows a longitudinal section of a further exemplary embodiment of the valve according to the invention, wherein only the essential regions are illustrated.

FIG. 2 shows a longitudinal section of a further exemplary embodiment of the valve 1 according to the invention, wherein only the essential regions are illustrated. Only the differences over the exemplary embodiment of FIG. 1 are discussed below.

In the exemplary embodiment of FIG. 2, the second cylinder 21 is screwed to the valve housing 4. The first cylinder 22 and the needle-shaped closing body 3 are designed as a single part. The valve seat 8 is arranged in a manner annularly surrounding the inlet channel 5. The valve spring 9 is braced between the first cylinder 22 and the valve housing 4 and, in contrast to the exemplary embodiment of FIG. 1, acts on the closing body 3 in an opening manner.

Figure 3:
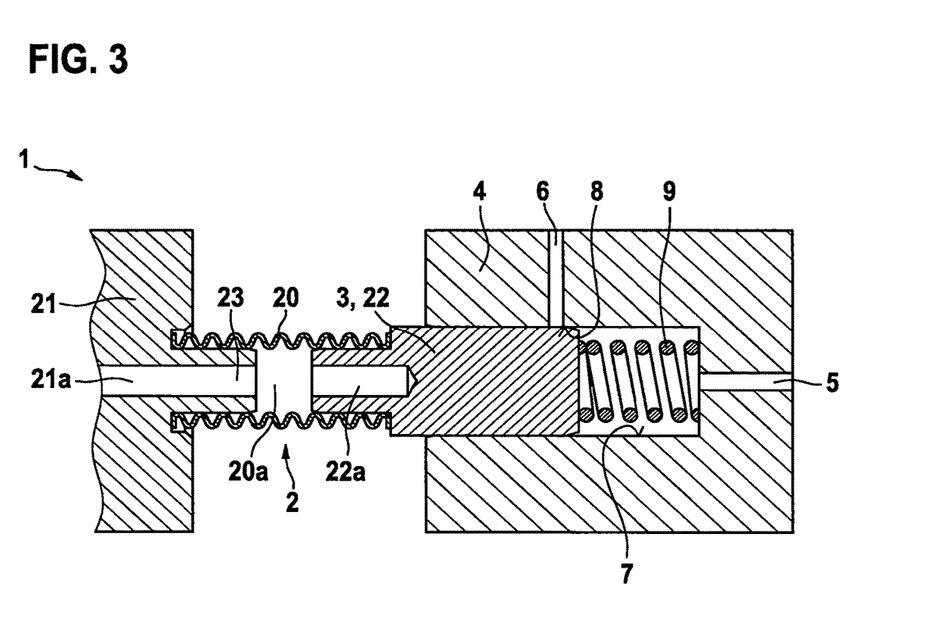
FIG. 3 shows a longitudinal section of a further exemplary embodiment of the valve according to the invention, wherein only the essential regions are illustrated.

FIG. 3 shows a longitudinal section of a further exemplary embodiment of the valve 1 according to the invention, wherein only the essential regions are illustrated. Only the differences over the exemplary embodiment of FIG. 1 are discussed below here too.

In this exemplary embodiment, the closing body 3 is designed as a single part together with the first cylinder 22. For this purpose, the first cylinder 22 is arranged in a longitudinally moveable manner in the housing bore 7, wherein the housing bore 7 also constitutes the valve seat 8. The valve 1 is therefore designed as a slide valve. The valve spring 9 is braced between first cylinder 22 and valve housing 4 and acts in an opening manner on the hydraulic connection between the inlet channel 5 and the outlet channel 6. However, in alternative embodiments, the valve spring 9 can also act in a closing manner.

Figure 4:
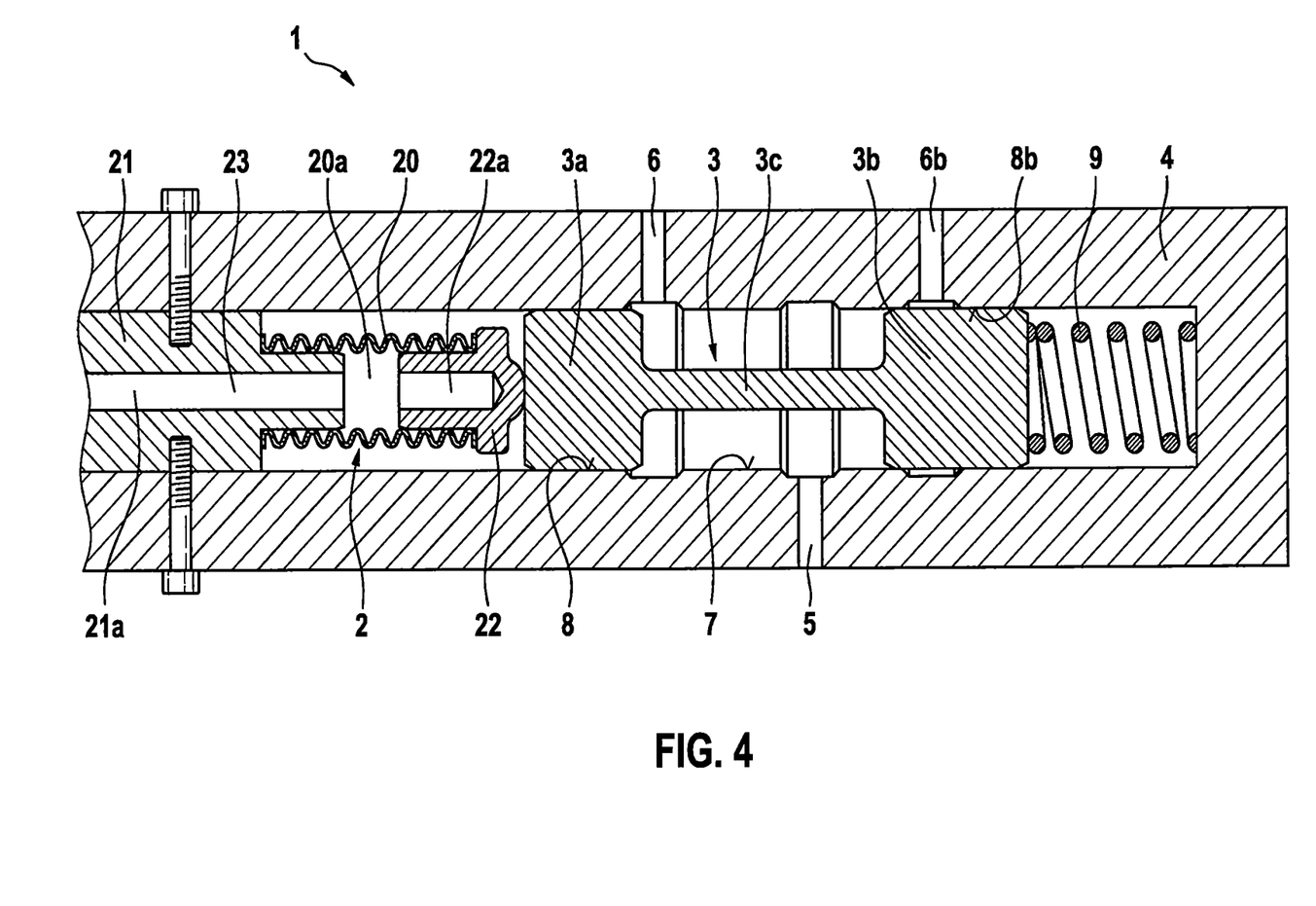
FIG. 4 shows a longitudinal section of a development of the valve according to the invention, wherein only the essential regions are illustrated.

FIG. 4 shows a longitudinal section of a development of the valve 1 according to the invention, wherein only the essential regions are illustrated. The valve 1 of FIG. 4 is designed as a slide valve with two outlet channels 6, 6b. For this purpose, the outlet channel 6 and a further outlet channel 6b open into the housing bore 7. The closing body 3 comprises a first closing cylinder 3a, a second closing cylinder 3b and a connecting bolt 3c for the connection of the two closing cylinders 3a, 3b. The first closing cylinder 3a, the second closing cylinder 3b and the connecting bolt 3c here can be designed as a single part or else as multiple parts.

The first closing cylinder 3a interacts with the first cylinder 22 of the metal-bellows/cylinder unit 2. Alternatively, the first closing cylinder 3a and the first cylinder 22 can also be designed as a single part. The second cylinder 21 is fixedly screwed to the valve housing 4.

The valve seat 8 and a further valve seat 8b are formed on the valve housing 4, wherein the valve seat 8 surrounds the outlet channel 6, and the further valve seat 8b surrounds the further outlet channel 6b. In the exemplary embodiment of FIG. 4, the valve seat 8 and the further valve seat 8b are designed as partial regions of the housing bore 7. The first closing cylinder 3a interacts with the valve seat 8 and the second closing cylinder 3b interacts with the further valve seat 8b.

Figure 5:
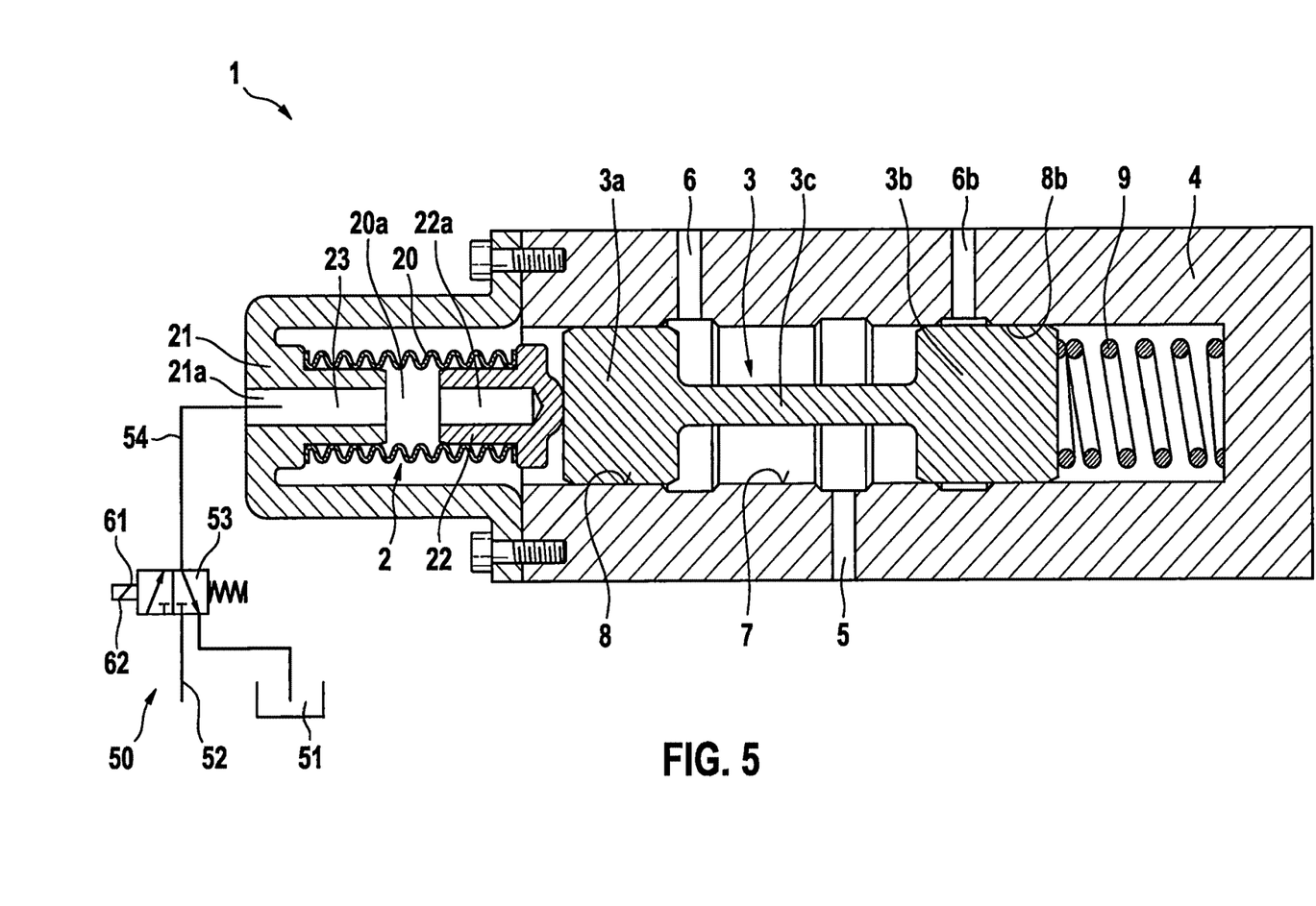
FIG. 5 shows a similar exemplary embodiment of the valve as FIG. 4, but additionally with activation of the metal-bellows/cylinder unit, wherein the activation is only illustrated schematically.

FIG. 5 shows a similar exemplary embodiment of the valve 1 as FIG. 4 but additionally with activation of the metal-bellows/cylinder unit 2, wherein the activation is only illustrated schematically. The activation of the valve 1 takes place by means of a control unit 50. The control unit 50 comprises a control valve 53, two electric connections 61, 62, a low-pressure accumulator 51, a pressure supply 52 and a connecting line 54.

The connecting line 54 leads from the control valve 53 to the cylinder bore 21a of the metal-bellows/cylinder unit 2. Via the control valve 53, the connecting line 54 is switchably coupled hydraulically or pneumatically either to the low-pressure accumulator 51 or to the pressure supply 52. The low-pressure accumulator 51 or the pressure supply 52 can be filled here, for example, with hydraulic oil or with air; accordingly, the activation of the metal-bellows/cylinder unit 2 takes place either hydraulically or pneumatically. The activation of the control valve 53 takes place electrically by the two electric connections 61, 62 and is preferably implemented by a control device (not illustrated).

Figure 6:
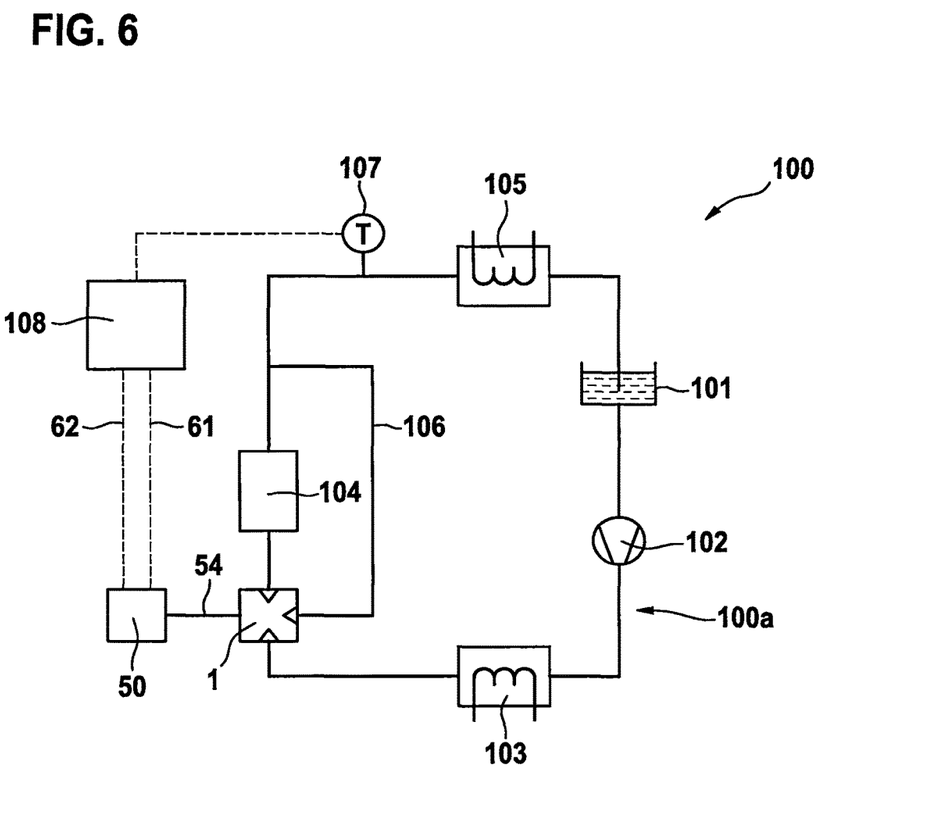
FIG. 6 shows schematically the valve according to the invention within a waste heat recovery system.

FIG. 6 shows the valve 1 according to the invention within a waste heat recovery system 100 as a bypass valve. The waste heat recovery system 100 has a circuit 100a which conducts a working medium and comprises a collecting container 101, a pump 102, an evaporator 103, the valve 1 as a bypass valve, an expansion machine 104 and a condenser 105 in the direction of flow of the working medium. Liquid working medium is conveyed by the pump 102 from the collecting container 101 into the evaporator 103 and is evaporated there by the thermal energy of an exhaust gas of an internal combustion engine. The evaporated working medium is subsequently expanded in the expansion machine with mechanical energy being output, for example to a generator (not illustrated) or to a gearing (not illustrated). The working medium is subsequently reliquified in the condenser 105 and returned to the collecting container 101.

According to the invention, the valve 1 is used as a bypass valve for the expansion machine 104. For this purpose, a bypass line 106 is arranged parallel to the expansion machine 104. Depending on the operating state of the internal combustion engine and resulting variables, for example temperatures of the working medium, the working medium is supplied to the expansion machine 104 or is guided past the expansion machine by the bypass line 106. For example, a temperature sensor 107 is arranged upstream of the condenser 105. The temperature sensor 107 determines the temperature of the working medium upstream of the condenser 105 and transmits a corresponding signal to a control device 108. The control device 108 activates the control unit 50 via the two electric connections 61, 62 depending on various data, such as, for example, the temperature of the working medium upstream of the condenser 105. The control unit 50 is connected to the valve 1 via the connecting line 54. The valve 1 is connected in such a manner that the working medium is either guided through the expansion machine 104 or through the bypass line 106. If the valve 1 is designed as a 3/3-way valve, the mass flow of the working medium can also be divided, and therefore part of the working medium is supplied to the expansion machine 104 and a further part is supplied to the bypass line 106.

Figure 7:
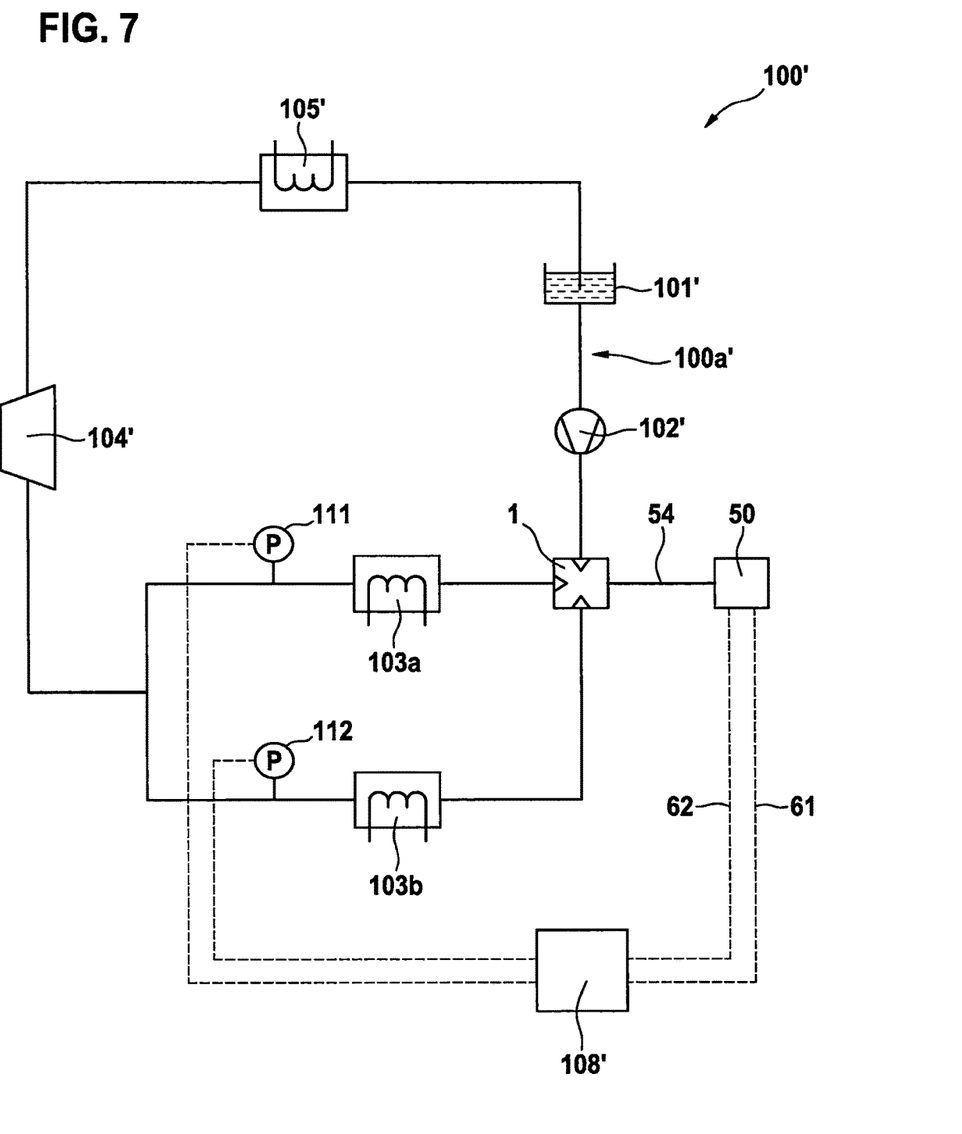
FIG. 7 shows schematically the valve according to the invention within a further waste heat recovery system.

FIG. 7 shows the valve 1 according to the invention within an alternative further waste heat recovery system 100' as a distributor valve 1. In contrast to the exemplary embodiment of FIG. 6, the circuit 100a' of this further waste heat recovery system 100' comprises a first evaporator 103a and a second evaporator 103b in a parallel connection; for example, the first evaporator 103a can be connected to an exhaust gas line of the internal combustion engine and the second evaporator 103b can be connected to an exhaust gas return line of the internal combustion engine.

The valve 1 according to the invention is designed as a 3/3-way valve and is arranged upstream of the two evaporators 103a, 103b, and therefore said valve divides the mass flow of the working medium between the two evaporators 103a, 103b. By way of example, a first pressure sensor 111 is arranged downstream of the first evaporator 103a and a second pressure sensor 112 is arranged downstream of the second evaporator 103b, said pressure sensors being able to be used as control variables within the waste heat recovery system 100'. The signals of the two pressure sensors 111, 112 are supplied to the control device 108' which determines an activation for the control unit 50 from said data and correspondingly activates the control unit 50 such that the valve 1 divides the mass flow of the working medium optimally between the two evaporators 103a, 103b.

The manner of operation of the valve 1 according to the invention is as follows:

The valve 1 is activated by the control unit 50. That is to say: the control valve 53 connects the cylinder bore 21a of the metal-bellows/cylinder unit 2 either to the low-pressure accumulator 51 or to the pressure supply 52. The low-pressure accumulator 51 is filled with working fluid under atmospheric pressure—for example hydraulic oil or air. By contrast, the pressure supply 52 has working fluid under working pressure—for example 1.5 bar to 15 bar.

If the cylinder bore 21a is connected to the low-pressure accumulator 51, the working chamber 23 of the metal-bellows/cylinder unit 2 is also below the pressure level of the low-pressure accumulator 51, and the closing body 3 is pressed by the valve spring 9 into a first valve position in the direction of the metal-bellows/cylinder unit 2 such that the metal bellows 2 is compressed.

If the cylinder bore 21a is connected to the pressure supply 52, the working chamber 23 of the metal-bellows/cylinder unit 2 is also below the pressure level of the pressure supply 52. The closing body 3 is thus pressed away by the pressure of the working fluid on the first cylinder 22 counter to the spring force of the valve spring 9 into a second valve position of the metal-bellows/cylinder unit 2 such that the metal bellows 20 is stretched.

Depending on the embodiment of the valve 1, the first and the second valve position have different functions:

Embodiment of FIG. 1
First valve position: the closing body 3 is pressed against the valve seat 8 by the valve spring 9 and thereby closes the hydraulic connection of the inlet channel 5 to the outlet channel 6.
Second valve position: the closing body 3 is pressed away from the valve seat 8 by the metal-bellows/cylinder unit 2 and thereby opens the hydraulic connection from the inlet channel 5 to the outlet channel 6.

Embodiments of FIGS. 2 and 3
First valve position: the closing body 3 is pressed or pushed away from the valve seat 8 by the valve spring 9 and thereby opens the hydraulic connection from the inlet channel 5 to the outlet channel 6.
Second valve position: the closing body 3 is pressed against the valve seat 8 or pushed over the valve seat 8 by the metal-bellows/cylinder unit 2 and thereby closes the hydraulic connection from the inlet channel 5 to the outlet channel 6.

Embodiments of FIGS. 4 and 5 as a 3/2-Way Valve
First valve position: the first closing cylinder 3a is pushed away from the valve seat 8 by the valve spring 9 and at the same time the second closing cylinder 3b is pushed over the further valve seat 8b. As a result, the hydraulic connection from the inlet channel 5 to the outlet channel 6 is open and a further hydraulic connection from the inlet channel 5 to the further outlet channel 6b is closed.
Second valve position: the second closing cylinder 3b is pushed over the valve seat 8 by the metal-bellows/cylinder unit 2 and at the same time the second closing cylinder 3b is pushed away from the further valve seat 8b. As a result, the hydraulic connection from the inlet channel 5 to the outlet channel 6 is closed and the further hydraulic connection from the inlet channel 5 to the further outlet channel 6b is open.

Embodiments of FIGS. 4 and 5 as a 3/3-Way Valve: in addition to the embodiments described above, these embodiments have a third valve position:
First valve position: as above in the case of the 3/2-way valve.
Second valve position: as above in the case of the 3/2-way valve.
Third valve position: the third valve position is an intermediate position between the first and the second valve position, that is to say, the working chamber 23 of the metal-bellows/cylinder unit is below a pressure level which lies between the pressure level of the low-pressure accumulator 51 and the pressure level of the pressure supply 52; this can be achieved, for example, by the working chamber 23 only being briefly supplied with pressurized working fluid from the pressure supply 52, or by the control valve 53 having a further connection to an intermediate pressure accumulator. In the third valve position, both the hydraulic connection from the inlet channel 5 to the outlet channel 6 and the further hydraulic connection from the inlet channel 5 to the further outlet channel 6b are open.

In all of the embodiments shown of the valve 1, the metal-bellows/cylinder unit 2 displaces the closing body 3 counter to the spring force of the spring valve 9 when the working chamber 23 is filled. As an alternative to the valve spring 9, however, use can also be made of embodiments with a membrane or a compression volume which push the closing body 3 back again when the working chamber 23 is emptied, and therefore the metal-bellows/cylinder unit 2 is compressed.

The embodiments of the valve 1 according to the invention of FIGS. 4 and 5 as a 3/3-way valve are very readily suitable for use within a waste heat recovery system 100, 100' of an internal combustion engine, as illustrated in FIGS. 6 and 7. The third valve position can be configured here in such a manner that both the hydraulic connection from the inlet channel 5 to the outlet channel 6 and the further hydraulic connection from the inlet channel 5 to the further outlet channel 6b are either open or closed.

The invention claimed is:

1. A valve (1) comprising a valve housing (4) and a closing body (3) arranged in a longitudinally moveable manner in the valve housing (4), wherein at least one inlet channel (5) and at least one outlet channel (6) are arranged in the valve housing (4), wherein the closing body (3) interacts by longitudinal movement with a valve seat (8) formed in the valve housing (4) and thereby opens and closes at least one hydraulic connection between the at least one inlet channel (5) and the at least one outlet channel (6), characterized in that the closing body (3) is drivable by a metal-bellows/cylinder unit (2), wherein the metal-bellows/cylinder unit (2) has a length-variable metal bellows (20), wherein the metal bellows (20) bounds a volume-variable working chamber (23) in a sealing manner, wherein the closing body (3) comprises a first closing cylinder (3a) and a second closing cylinder (3b), wherein the first closing cylinder (3a) interacts with the valve seat (8), and wherein the second closing cylinder (3b) interacts with a further valve seat (8b) formed in the valve housing (4).

2. The valve (1) as claimed in claim 1, characterized in that the metal-bellows/cylinder unit (2) comprises a first cylinder (22), wherein the first cylinder (22) is arranged displaceably with respect to the valve housing (4).

3. The valve (1) as claimed in claim 2, characterized in that the metal-bellows/cylinder unit (2) comprises a second cylinder (21), wherein the second cylinder (21) is fixedly connected to the valve housing (4).

4. The valve (1) as claimed in claim 2, characterized in that the first cylinder (22) interacts with the closing body (3).

5. The valve (1) as claimed in claim 2, characterized in that the first cylinder (22) and the closing body (3) are a single part.

6. The valve (1) as claimed in claim 3, characterized in that a cylinder bore (21a) is formed in the second cylinder (21), and in that a volume-variable additional volume (20a) which, together with the cylinder bore (21a), forms the working chamber (23) is formed in an interior of the metal bellows (20) between the first cylinder (22) and the second cylinder (21).

7. The valve (1) as claimed in claim 3, characterized in that a blind hole bore (22a) is formed in the first cylinder (22), in that a cylinder bore (21a) is formed in the second cylinder (21), and in that a volume-variable additional volume (20a) is formed in an interior of the metal bellows (20) between the first cylinder (22) and the second cylinder (21), wherein the blind hole bore (22a) together with the cylinder bore (21a) and the additional volume (20a) forms the working chamber (23).

8. The valve (1) as claimed in claim 6, characterized in that the working chamber (23) is finable by a control unit (50) with a working fluid, wherein the cylinder bore (21a) is connected to the control unit (50) by a connecting line (54).

9. The valve (1) as claimed in claim 1, characterized in that a further outlet channel (6b) is arranged in the valve housing (4), wherein the second closing cylinder (3b) interacts with the further valve seat (8b) and thereby opens and closes a further hydraulic connection between the inlet channel (5) and the further outlet channel (6b).

10. The valve (1) as claimed in claim 9, characterized in that, in a first valve position of the valve (1), the at least one hydraulic connection is open and the further hydraulic connection is closed, and in that, in a second valve position of the valve (1), the at least one hydraulic connection is closed and the further hydraulic connection is open.

11. A waste heat recovery system (100) comprising a circuit (100a) conducting a working medium, wherein the circuit (100a) comprises a collecting container (101), a pump (102), an evaporator (103), a bypass valve (1), an expansion machine (104) and a condenser (105) in a direction of flow of the working medium, wherein a bypass line (106) is arranged parallel to the expansion machine (104), and wherein the bypass valve (1) controls a mass flow of the working medium to the expansion machine (104) and to the bypass line (106), characterized in that the bypass valve (1) is a valve (1) as claimed in claim 9.

12. A waste heat recovery system (100') comprising a circuit (100a') conducting a working medium, wherein the circuit (100a') comprises a collecting container (101'), a pump (102'), a distributor valve (1), two evaporators (103a, 103b) in a parallel connection, an expansion machine (104') and a condenser (105') in a direction of flow of the working medium, wherein the distributor valve (1) controls mass flows of the working medium to the two evaporators (103a, 103b), characterized in that the distributor valve (1) is a valve (1) as claimed in claim 9.

13. The valve (1) as claimed in claim 2, characterized in that the metal-bellows/cylinder unit (2) comprises a second cylinder (21), wherein the second cylinder (21) is fixedly screwed to the valve housing (4).

14. The valve (1) as claimed in claim 7, characterized in that the working chamber (23) is fillable by a control unit (50) with a working fluid, wherein the cylinder bore (21a) is connected to the control unit (50) by a connecting line (54).

* * * * *